United States Patent
Ohtsu (10) Patent No.: US 10,471,867 B2
(45) Date of Patent: Nov. 12, 2019

(54) VEHICLE SEAT

(71) Applicant: TOYOTA BOSHOKU KABUSHIKI KAISHA, Aichi-ken (JP)

(72) Inventor: Hideki Ohtsu, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 31 days.

(21) Appl. No.: 16/011,848

(22) Filed: Jun. 19, 2018

(65) Prior Publication Data

US 2019/0009698 A1  Jan. 10, 2019

(30) Foreign Application Priority Data

Jul. 6, 2017  (JP) .................................. 2017-132537

(51) Int. Cl.
   *B60N 2/58*   (2006.01)
   *B60N 2/60*   (2006.01)

(52) U.S. Cl.
   CPC ........... *B60N 2/5883* (2013.01); *B60N 2/609* (2013.01)

(58) Field of Classification Search
   CPC ............................. B60N 2/5883; B60N 2/609
   USPC ................................................... 297/452.58
   See application file for complete search history.

(56) References Cited

U.S. PATENT DOCUMENTS

| | | | | |
|---|---|---|---|---|
| 6,152,534 | A * | 11/2000 | Maeda ................. | B60N 2/5825 297/218.3 |
| 7,469,968 | B2 * | 12/2008 | Hazlewood ............. | B60N 2/58 297/452.58 |
| 7,823,980 | B2 * | 11/2010 | Niwa ................... | B60N 2/5891 297/218.2 |
| 9,517,709 | B2 * | 12/2016 | Kitajima ................ | B60N 2/58 |
| 2017/0113588 | A1 * | 4/2017 | Ochiai ................. | B60N 2/5883 |

FOREIGN PATENT DOCUMENTS

EP   3 103 678   12/2016

* cited by examiner

*Primary Examiner* — Milton Nelson, Jr.
(74) *Attorney, Agent, or Firm* — Greenblum & Bernstein, P.L.C.

(57) ABSTRACT

A vehicle seat including: a seat pad; and a seat cover including: a first cover piece and a second cover piece which are arranged adjacent to each other; and a sewn portion, wherein the first cover piece includes a general portion which forms a design surface of the seat and a thin end portion which projects from an edge of the general portion and has a thickness smaller than a thickness of the general portion, and wherein in the sewn portion in a tilted state, the thin end portion is bent back towards a back side of the general portion so as to form a lateral U shape, and a part of the thin end portion which is arranged at a back side thereof serves as a seam allowance of the first cover piece and is overlapped with and sewn to a seam allowance of the second cover piece.

6 Claims, 11 Drawing Sheets

VEHICLE SEAT

CROSS-REFERENCE TO RELATED APPLICATIONS

This application claims priority from Japanese Patent Application No. 2017-132537 filed on Jul. 6, 2017, the entire contents of which are incorporated herein by reference.

TECHNICAL FIELD

The disclosure relates to a vehicle seat which includes a seat pad and a seat cover and in which a first cover piece and a second cover piece configuring the seat cover covers an outer surface of the seat pad in a state where a sewn portion (a part where seam allowances are overlapped with each other) serving as a sewing position of the cover pieces is tilted in a constant direction.

BACKGROUND

This type of vehicle seat includes a seat pad forming an outer shape of the seat and a seat cover covering an outer surface of the seat pad, and a design surface of the seat is configured by the seat cover. The seat cover is formed by sewing a plurality of cover pieces, and a seam at which the cover pieces are sewn to each other extends in a predetermined direction. That is, the seat cover is provided with a sewn portion at which seam allowances of a pair of adjacent cover pieces are overlapped in a state where front surfaces thereof face each other. Further, in the sewn portion, the seam allowances are sewn at the seam, and the seam is arranged between a pair of cover pieces and extends in a predetermined direction. Further, in the seat cover covering the outer surface of the seat pad, each cover piece is deployed in a planar shape with the sewn portion serving as a base point, so as to configure the design surface, and the sewn portion is arranged on a back side of the design surface. From the viewpoint of avoiding meandering or folding of the seam, the sewn portion is arranged on the seat pad in a state of being tilted in a constant direction.

For example, in a seat cover disclosed in EP 3103678 A1, a pair of cover pieces is deployed in a planar shape with a sewn portion serving as a base point, so as to configure a design surface, and the sewn portion is arranged on a back side of the design surface. Further, on a back side of the seat cover, a planar regulating member is attached along the back surface of the seat cover, and the regulating member stretches the sewn portion so as to tilt the sewn portion in a constant direction. In the sewn portion of such a state, an end portion including a seam allowance of one of the cover pieces is curved, with the sewn portion serving as a base point, to form a lateral U shape on a transverse section thereof, and a seam allowance of the other cover piece is overlapped on a lower side of the end portion. Since the end portion of the one cover piece curved into the lateral U shape is overlapped with the seam allowance of the other cover piece, a wall thickness of the sewn portion in the tilted state becomes thick than other parts of the seat cover.

Incidentally, in this type of vehicle seat, there is a demand for matching a shape of the outer surface of the seat pad and a shape of the design surface of the seat cover as much as possible, from a viewpoint of improving shape reproducibility of the seat. However, since the sewn portion is relatively thicker in the known technique, the seat cover tends to be raised partially due to the sewn portion. For example, the outer surface of the seat pad may be partially curved from the viewpoint of improving the design of the seat. Further, when the sewn portion is arranged on a region forming the curved surface of the seat pad, there is a possibility that the seat cover may be raised excessively due to circumferential length difference between the front and back of the sewn portion, or the like. For this reason, the configuration of the known technique cannot be adopted smoothly from the viewpoint of improving the shape reproducibility of the seat, or the like.

SUMMARY

The disclosure has been made in view of the above points, and a problem to be solved by the disclosure is to arrange a sewn portion, serving as a sewing position of first and second cover pieces, along an outer surface of a seat pad in a tilted state without raising the seat cover as much as possible.

According to an aspect of the disclosure, there is provided a vehicle seat including: a seat pad forming an outer shape of the seat; and a seat cover covering an outer surface of the seat pad, the seat cover including: a first cover piece and a second cover piece which are arranged adjacent to each other, and a sewn portion in which a seam allowance of the first cover piece and a seam allowance of the second cover piece are overlapped so that front surfaces thereof face each other and are sewn to each other, wherein the first cover piece and the second cover piece are deployed in a planar shape with the sewn portion serving as a base point and cover an surface of the seat pad in a state where at least a part of the sewn portion arranged at back sides of the first and second cover pieces is tilted towards the back side of the first cover piece, wherein the first cover piece includes a general portion which forms a design surface of the seat and a thin end portion which projects from an edge of the general portion and has a thickness smaller than a thickness of the general portion, and wherein in the sewn portion in a tilted state, the thin end portion is bent back towards a back side of the general portion so as to form a lateral U shape, and a part of the thin end portion which is arranged at a back side thereof serves as the seam allowance of the first cover piece and is overlapped with and sewn to the seam allowance of the second cover piece.

Accordingly, since an end portion of the first cover piece which is bent back to form the lateral U shape in the sewn portion is configured by the thin end portion which is relatively thin, it is possible to avoid, as much as possible, the seat cover from being raised excessively due to the sewn portion.

DETAILED DESCRIPTION

Hereinafter, embodiments for implementing the disclosure will be described with reference to FIGS. 1 to 12. In each drawing, arrows indicating a front-rear direction, an upper-lower direction, and a left-right direction of a vehicle seat are appropriately shown. Incidentally, for convenience, thicknesses of the seat cover and the regulating member are exaggerated and a gap is provided between the seat cover and the seat pad in FIG. 2.

Figure 1:
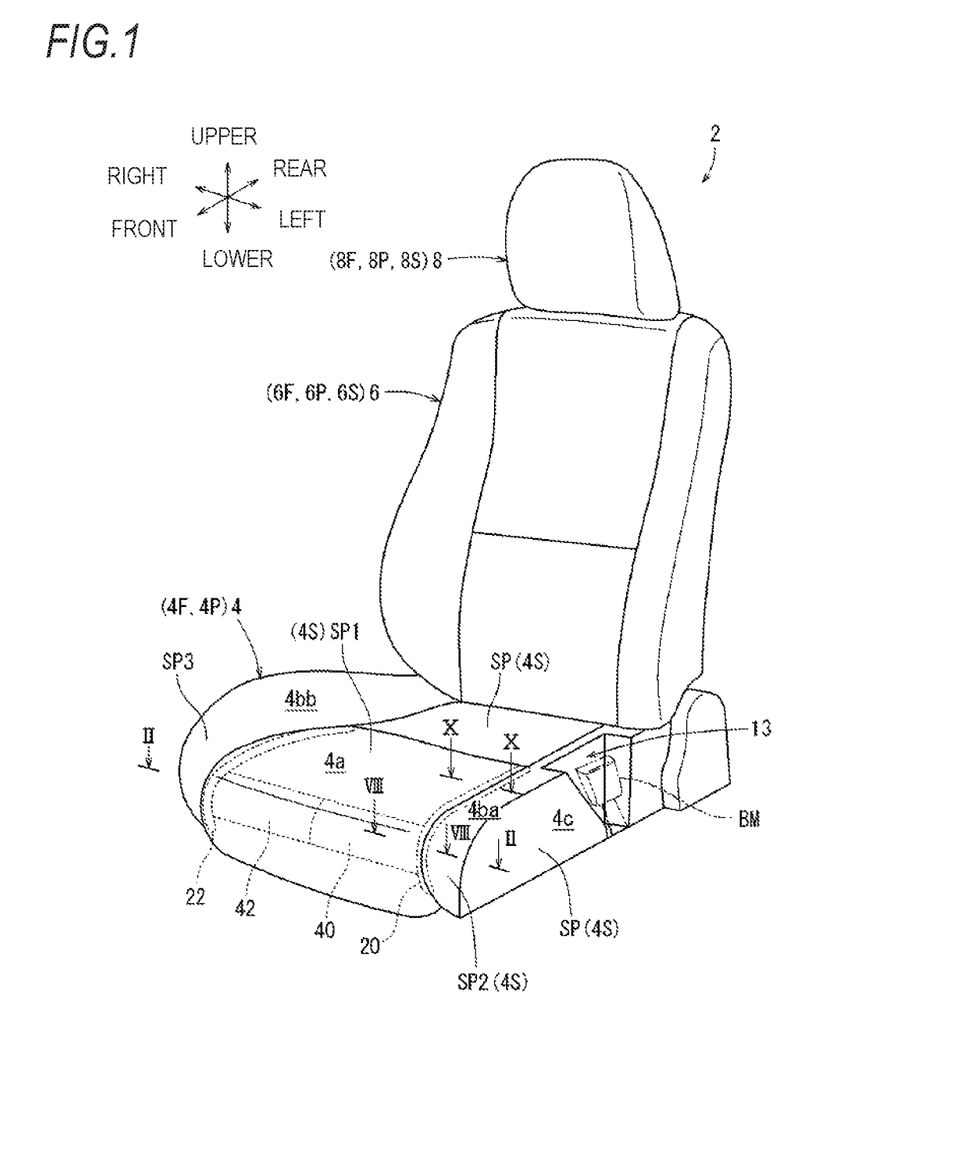
FIG. 1 is a perspective view of a vehicle seat.

A vehicle seat 2 in FIG. 1 is a vehicle interior trim to be arranged at a third row of a vehicle compartment and includes a seat cushion 4, a seat back 6 and a headrest 8. Each of these seat configuration members (4, 6, 8) includes a seat frame (4F, 6F, 8F) forming a seat framework, a seat pad (4P, 6P, 8P) forming an outer shape of a seat, and a seat cover (4S, 6S, 8S) covering the seat pad. Further, a lower portion of the seat back 6 of a standing state is coupled to a rear portion of the seat cushion 4 (which will be described in detail later) in a manner of the seat back 6 being capable of standing and falling. Also, the headrest 8 is arranged on an upper portion of the seat back 6 of the standing state.

[Seat Cushion]

Figure 2:
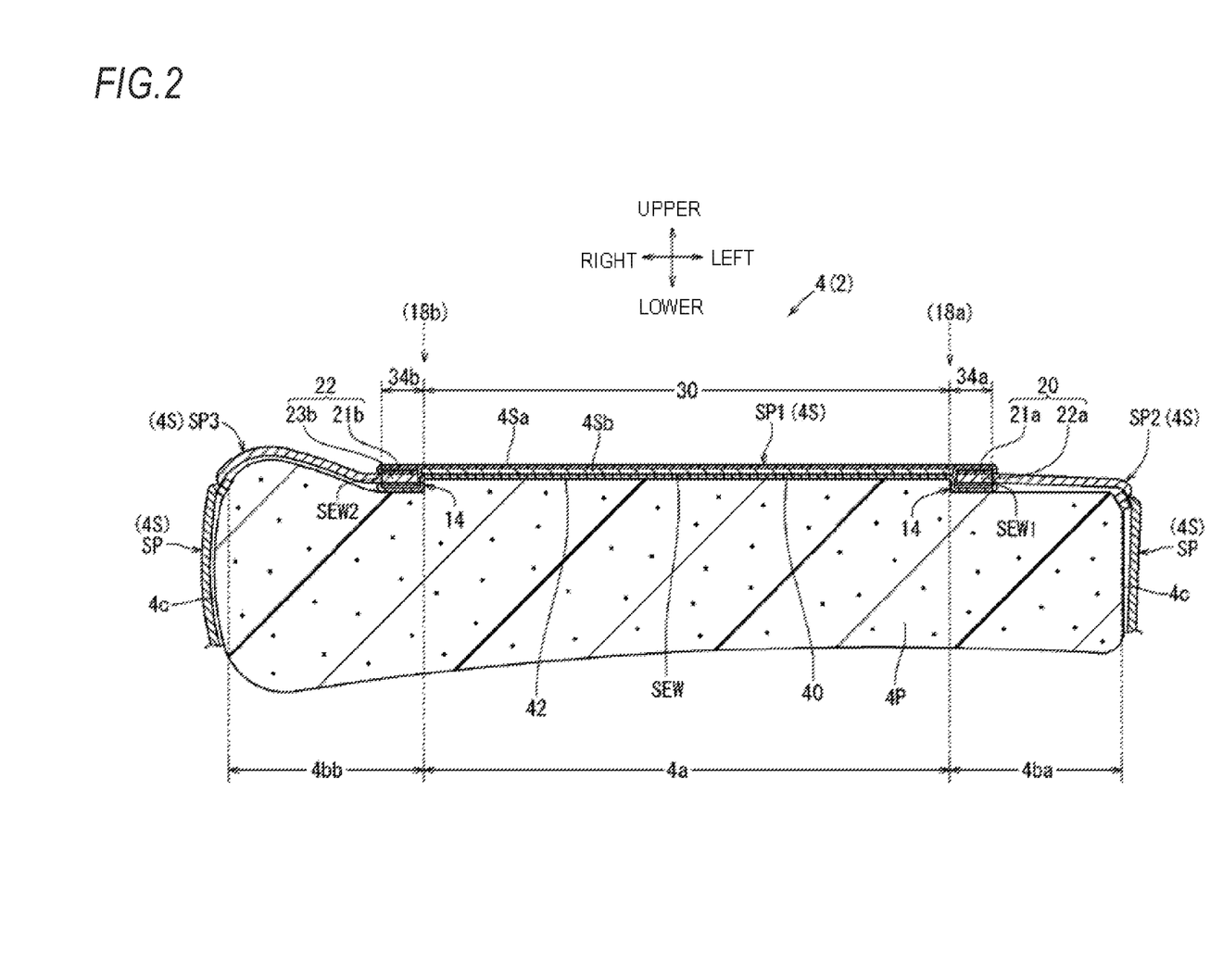
FIG. 2 is a cross-sectional view of a seat cushion corresponding to a cross section taken along a line II-II of FIG. 1.

The seat cushion 4 is a member having a substantially rectangular shape in a top view and an occupant can seat thereon. With reference to FIGS. 1 and 2, the seat cushion 4 includes basic configurations 4F, 4P, 4S, and seat cover-related configurations (sewn portions 20, 22, and a pair of regulating members 40, 42). Details of each member will be described later. In the seat cushion 4, the seat pad 4P (which will be described in detail later) is arranged on the seat frame 4F and covered by the seat cover 4S (which will be described in detail later). Here, the seat frame 4F (not shown) is usually a frame body having a substantially rectangular shape in a top view, and can be made of a material excellent in rigidity, such as metal, or hard resin.

Further, the seat cover 4S of the embodiment includes a plurality of later-described cover pieces (such as SP1 to SP3), and sewn portions 20, 22 serving as sewing positions between the cover pieces (for convenience, only a part of the sewn portions is denoted by reference numerals in each drawing). Further, a pair of adjacent cover pieces SP1, SP2 (or SP1, SP3) covers an outer surface of the seat pad 4P in a state where the sewn portion 20 (or 22) arranged on a back side of the cover piece is tilted in a predetermined direction. In this type of seat configuration, there is a demand for matching a shape of the outer surface of the seat pad 4P and a shape of the design surface of the seat cover 4S as much as possible from the viewpoint of improving shape reproducibility of the seat. However, the seat cover 4S is relatively easily raised due to that a part of the cover pieces corresponding to the sewn portions 20, 22 in a tilted state are overlapped with each other. Therefore, in the embodiment, with a latter-described configuration, the sewn portions 20, 22 serving as sewn positions of a pair of cover pieces are brought into a tilted state without raising the seat cover as much as possible, and are arranged along the outer surface of the seat pad 4P. Hereinafter, each configuration will be described in detail.

[Seat Pad]

Figure 3:
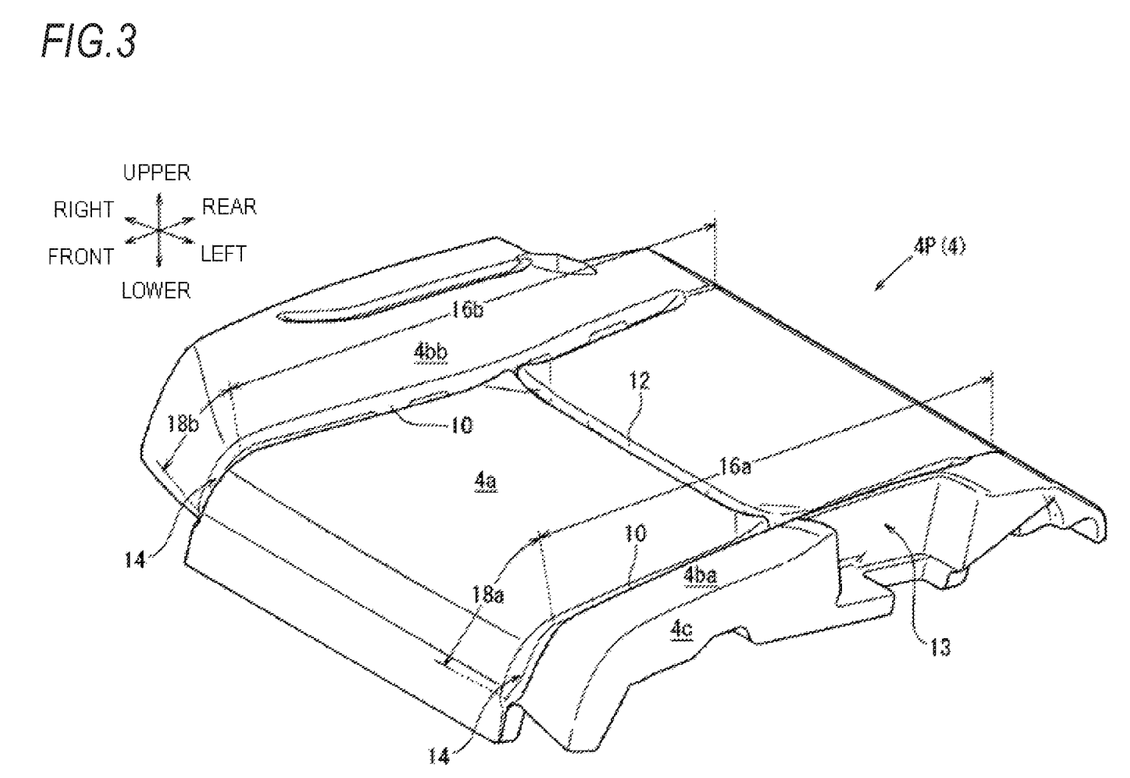
FIG. 3 is a perspective view of a seat pad.
Figure 4:
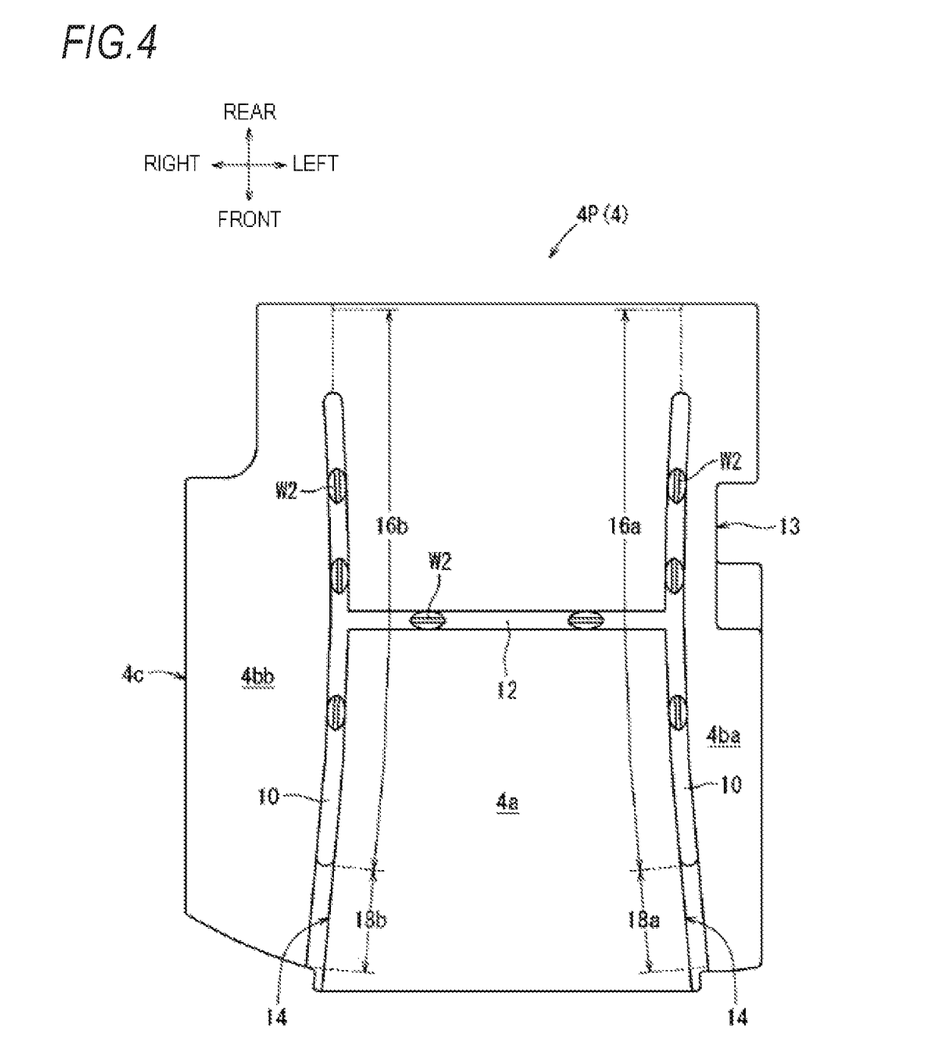
FIG. 4 is a top view of the seat pad.

With reference to FIGS. 2 to 4, the seat pad 4P is a member having a substantially rectangular shape in a top view, and an occupant can be elastically supported thereon. Here, a material of the seat pad 4P is not particularly limited, and foamed resin such as foamed polyurethane (density: 10 kg/m$^3$ to 60 kg/m$^3$) can be exemplified. Further, with reference to FIGS. 3 and 4, a part of the seat pad 4P serving as the outer surface thereof can be divided into a main portion 4a, a left side portion 4ba, a right side portion 4bb, and right and left frame portions 4c, and a plurality of groove portions 10, 12 are further provided. The main portion 4a is a substantially flat part formed on a center in a left-right direction (that is a seat width direction), and extends in a front-rear direction with a width dimension allowing an occupant to seat thereon. Also, each side portion 4ba, 4bb (which will be described in detail later) protrudes upward relatively on the left or right of the main portion 4a, and can support sides of the occupant, e.g., when the vehicle is running on a corner. Also, each frame portion 4c forms right and left side surfaces of the seat cushion 4 in the seat width direction.

Also, with reference to FIG. 4, the plurality of groove portions (a pair of longitudinal groove portions 10 on the left and right, and a lateral groove portion 12) are linearly recessed parts provided on sides of a seating surface of the seat pad 4P. Further, the groove portions 10, 12 are provided on the seat pad 4P to form an approximate H shape in a top view, and the longitudinal groove portions 10 extending in the front-rear direction are provided between the main portion 4a and the left and right side portions 4ba and 4bb separately. Also, the lateral groove portion 12 is provided to traverse the main portion 4a in the left-right direction, and both ends of the lateral groove portion 12 are in communication with a corresponding longitudinal groove portion 10. A fixing wire W2 is arranged on a bottom side of each groove portion 10, 12, and a part (such as rear portions of other sewn portions 20, 22) of the seat cover 4S shown in FIG. 2 can be drawn and attached to the fixing wire W2.

Also, with reference to FIGS. 3 and 4, the left and right side portions (left side portion 4ba, right side portion 4bb) include step parts 14, general regions 16a, 16b, and curved regions 18a, 18b. Further, in the embodiment, the left and right side portions 4ba, 4bb correspond to "the first part of the outer surface of the seat pad" of the disclosure separately. The left side portion 4ba is a substantially rectangular part elongated in the front-rear direction in a top view, and is arranged on the left side of the main portion 4a. A rectangular cutout portion 13 is provided in a vicinity of a rear part of the left side portion 4ba, and a member such as a buckle BM can be arranged in the cutout portion 13, as shown in FIG. 1. Also, the right side portion 4bb is a substantially rectangular part elongated in the front-rear direction in a top view, and is arranged on a right side of the main portion 4a. Further, the left and right side portions 4ba and 4bb are lower by one step (shorter in the front-rear direction) than the adjacent main portion 4a. That is, a left step portion 14 is provided between a right edge of a front part of the left side portion 4ba and the main portion 4a, and the left side portion 4ba is lowered by one step via the left step portion 14. Similarly, a right step portion 14 is provided between a left edge of a front part of the right side portion 4bb and the main portion 4a, and the right side portion 4bb is lowered by one step via the right step portion 14.

[General Region and Curved Region]

With reference to FIGS. 3 and 4, the main portion 4a and the left and right side portions 4ba, 4bb have a substantially flat surface shape on upper surfaces thereof, but front surfaces thereof are configured by curved surfaces projecting forward. Further, a general region 16a (16b) and a curved region 18a (18b) are separately formed on a main portion side of a periphery of each side portion 4ba (4bb). Here, in the embodiment, the general regions and the curved regions having the substantial same configuration are provided on the left and right side portions 4ba and 4bb symmetrically. For example, the general region 16a of the left side part 4ba is a part that forms a right edge of an upper surface (a part excluding a front surface) of the left side portion 4ba, and extends linearly in the front-rear direction in a substantially horizontal state. The right edge of the upper surface forming the general region 16a substantially coincides with a position where the longitudinal groove portion 10 is provided, and a later-described part of the seat cover 4S is drawn and attached thereto. Also, the curved region 18a is a part that forms a right edge of the front surface of the left side portion 4ba, and gradually curves downwards as going forward. The right edge of the front surface forming the curved region 18a is provided more forward than the longitudinal groove portion 10, and a thin end portion 34a (which will be described later) of a first cover piece SP1 in FIG. 2 can be arranged on the curved region 18a. Further, the general region 16b and the curved region 18b are also provided on a left edge of the right side portion 4bb so as to be symmetrical with the left side portion 4ba, and a thin end portion 34b (which will be described later) in FIG. 2 can be arranged on the curved region 18b.

[Seat Cover]

With reference to FIGS. 1 and 2, the seat cover 4S is a surface member covering the seat pad 4P. The seat cover 4S includes a plurality of cover pieces (such as a first cover piece SP1 to a third cover piece SP3), sewn portions 20, 22, and a pair of regulating members 40, 42 which will be described later (for convenience, a specific symbol is only attached to a specific cover piece and the other cover pieces are denoted by a common symbol SP in FIGS. 1 and 2). Further, the first cover piece SP1 is a cover piece covering a front part of the main portion 4a, and has a rectangular shape elongated in the left-right direction in a top view. Also, the second cover piece SP2 is a cover piece covering the left side portion 4ba and has a substantially rectangular shape elongated in the front-rear direction in a top view. Also, the third cover piece SP3 is a cover piece covering the right side portion 4bb and has a substantially rectangular shape elongated in the front-rear direction in a top view. Further, in the embodiment, the first cover piece SP1 covering the front part of the main portion 4a corresponds to the "the first cover piece" of the disclosure, and the second cover piece SP2 covering the left side portion 4ba corresponds to the "the second cover piece" of the disclosure. Further, the third cover piece SP3 covering the right side portion 4bb also corresponds to "the second cover piece" of the disclosure.

[Surface Member and Elastic Member]

Figure 5:
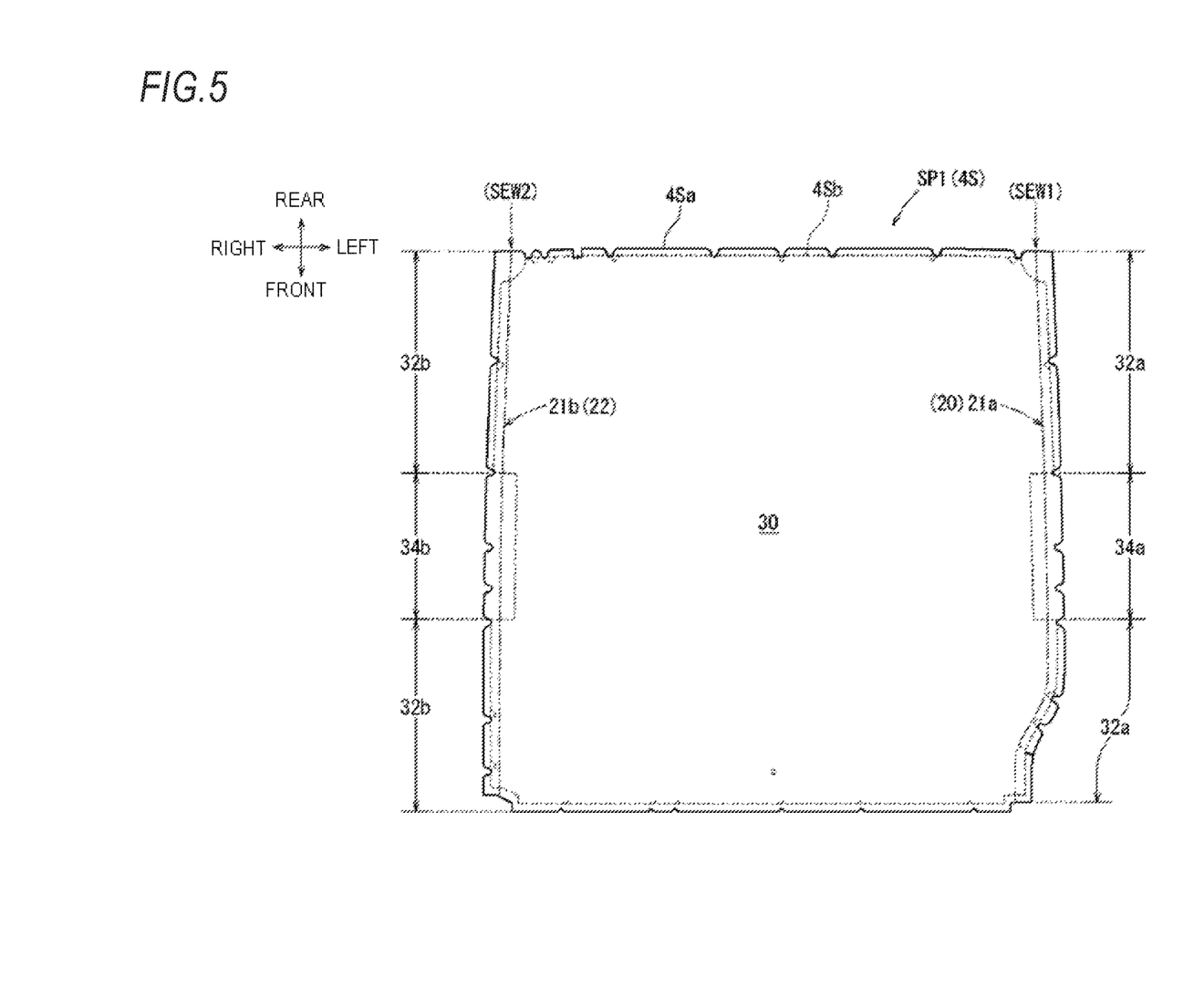
FIG. 5 is a front view of one of the cover pieces.
Figure 6:
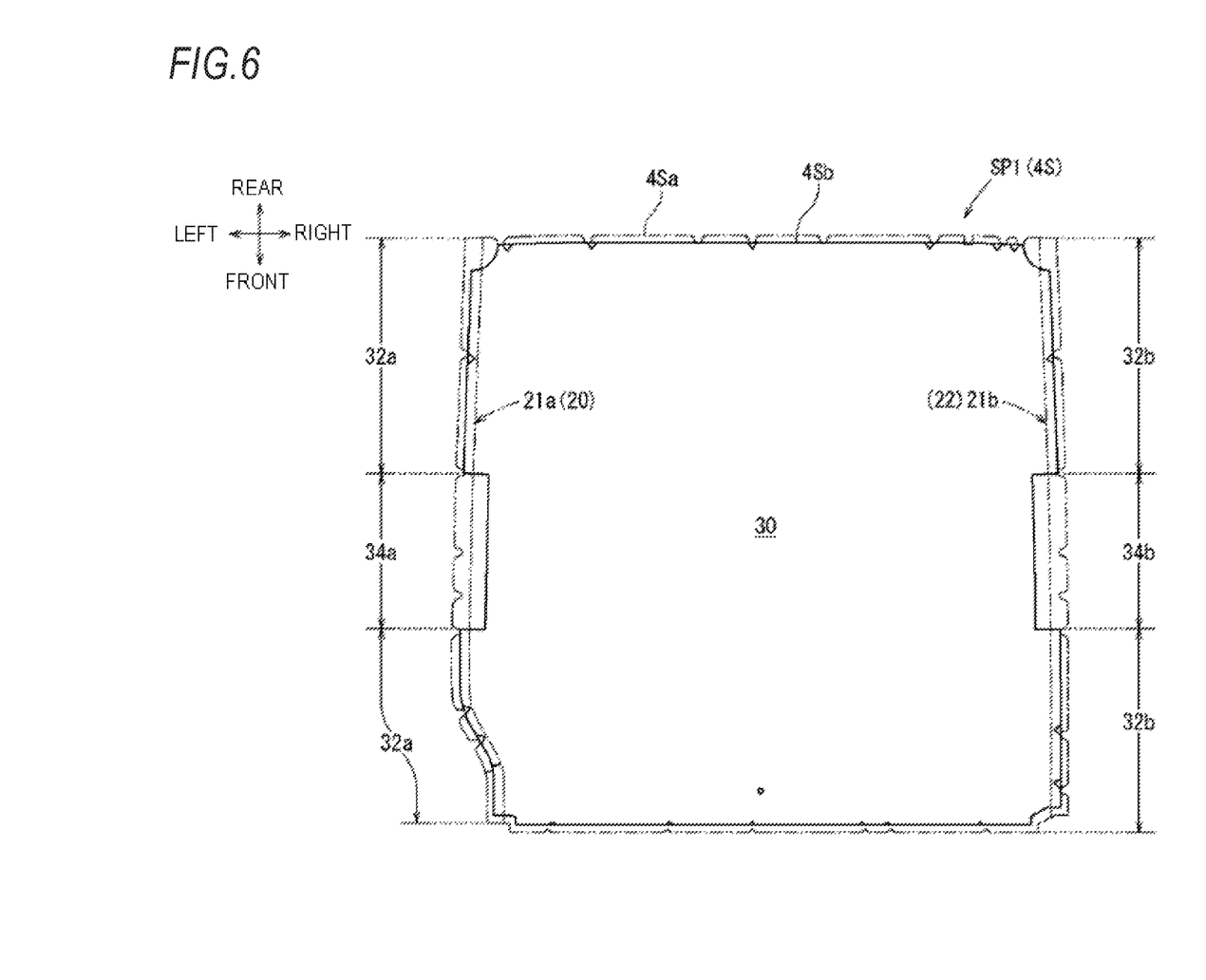
FIG. 6 is a back view of an elastic material of the one cover piece.
Figure 7:
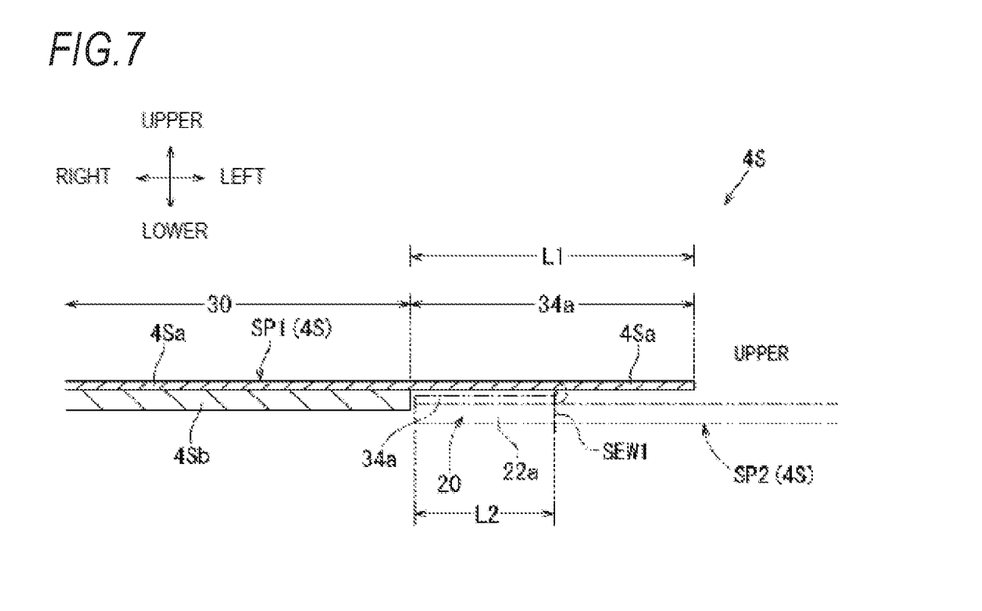
FIG. 7 is a cross-sectional view of a part of the one cover piece.

Here, with reference to FIGS. 5 to 7, the seat cover 4S includes a surface member 4Sa forming the design surface of the seat, and an elastic material 4Sb laminated on the back side of the surface member 4Sa. As a material of the surface member 4Sa, for example, cloth (woven fabric, knitted fabric, and nonwoven fabric) or leather (natural leather, and synthetic leather) can be used, and the surface member 4Sa in the embodiment is formed of the synthetic leather. Also, as a material of the elastic material 4Sb, an elastically expandable foamed resin such as a urethane lamination can be used. Further, the surface member 4Sa and the elastic member 4Sb can be integrally laminated by a method such as flame lamination.

Further, with reference to FIG. 2, the adjacent cover pieces SP1, SP2 (SP1, SP3) are sewn to each other at the sewn portion 20 (22) in which the seam allowances are overlapped so that front surfaces thereof face each other. Here, since the sewing configuration of each cover piece is substantially the same, the sewing configuration of the first cover piece SP1 to the third cover piece SP3 will be described below as an example. As shown in FIGS. 2 and 5, the first cover piece SP1 is provided with a left first seam allowance 21a formed along a left edge thereof and a right first seam allowance 21b formed along a right edge thereof. Further, these left and right first seam allowances 21a, 21b are formed at two kinds of later-described end portions (general end portions 32a, 32b, and thin end portions 34a, 34b) according to the position where the seat pad 4P should be arranged. Also, with reference to FIG. 2, the second cover piece SP2 is provided with a second seam allowance 22a formed along a right edge thereof. Also, the third cover piece SP3 is provided with a third seam allowance 23b formed along a left edge thereof.

[General Portion, Thin End Portion, and General End Portion]

With reference to FIGS. 5 and 6, the first cover piece SP1 includes a general portion 30 configuring the design surface, a left edge portion (left general end portions 32a, and a left thin end portion 34a) and a right edge portion (right general end portions 32b, and right thin end portion 34b). Here, the general portion 30 covers the outer surface of the main portion 4a of the seat pad 4P shown in FIG. 2, and is configured by the surface member 4Sa and the elastic member 4Sb. Further, a left edge portion of the first cover piece SP1 is a part including the left first seam allowance 21a, and is configured by the left general end portions 32a and the left thin end portion 34a. Also, a right edge portion of the first cover piece SP1 is a part including the right first seam allowance 21b, and is configured by the right general end portions 32b and the right thin end portion 34b. Here, the left edge portion and the right edge portion of the first cover piece SP1 have substantially the same basic configuration except that they are symmetrically arranged. Therefore, details of the left edge portion (the left general end portions 32a and the left thin end portion 34a) of the first cover piece SP1 will be described below as an example. Incidentally, the other cover piece (such as SP2 and SP3) only has a general portion and a general end portion, although the reference numerals are omitted for convenience.

In the left edge portion of the first cover piece SP1, a left general end portion 32a on a rear side, the left thin end portion 34a, and a left general end portion 32a on a front side are adjacently provided in this order. Here, the general end portions 32a on the front and rear sides are roughly configured by both the surface member 4Sa and the elastic member 4Sb, and have the same thickness as that of the general portion 30 (in each figure, the elastic member is in a state of slightly projecting outwards). Also, the left general end portion 32a on the rear side can be arranged along the left general region 16a of the seat pad 4P shown in FIG. 4, and the left general end portion 32a on the front side is drawn from a front end of the left curved region 18a shown in FIG. 4 to a back side of the seat. Further, the left thin end portion 34a is an end portion with small thickness which projects leftwards from the left edge of the general portion 30, and the thickness of the left thin end portion 34a is set to be smaller than that of the general portion 30 by entirely removing the elastic member 4Sb, which is as shown in FIGS. 5 to 7. The left thin end portion 34a is a part having a substantially rectangular shape in a top view, and is provided on a front side of the left edge portion of the first cover piece SP1 so as to be arranged along the left curved region 18a of the seat pad 4P shown in FIG. 4. Here, it is desirable that the left thin end portion 34a has a length in the front-rear direction such that the left thin end portion 34a can cover the most or entire left curved region 18a shown in FIG. 4 or the like. Also, a left-right length L1 (a length in the projecting direction) of the left thin end portion 34a shown in FIG. 7 may be any dimension as long as it can configure the left first seam allowance 21a in a state of being bent back into a lateral U shape, and the length is typically set to be twice or more of a corresponding length L2 of the sewn portion 20 (approximately twice in the embodiment). Since the length of the left thin end portion 34a is optimized in this way, the left thin end portion 34a can be set into the lateral U shape and arranged on the second seam allowance 22a accurately, as which will be described later.

[Regulating Member]

Figure 8:
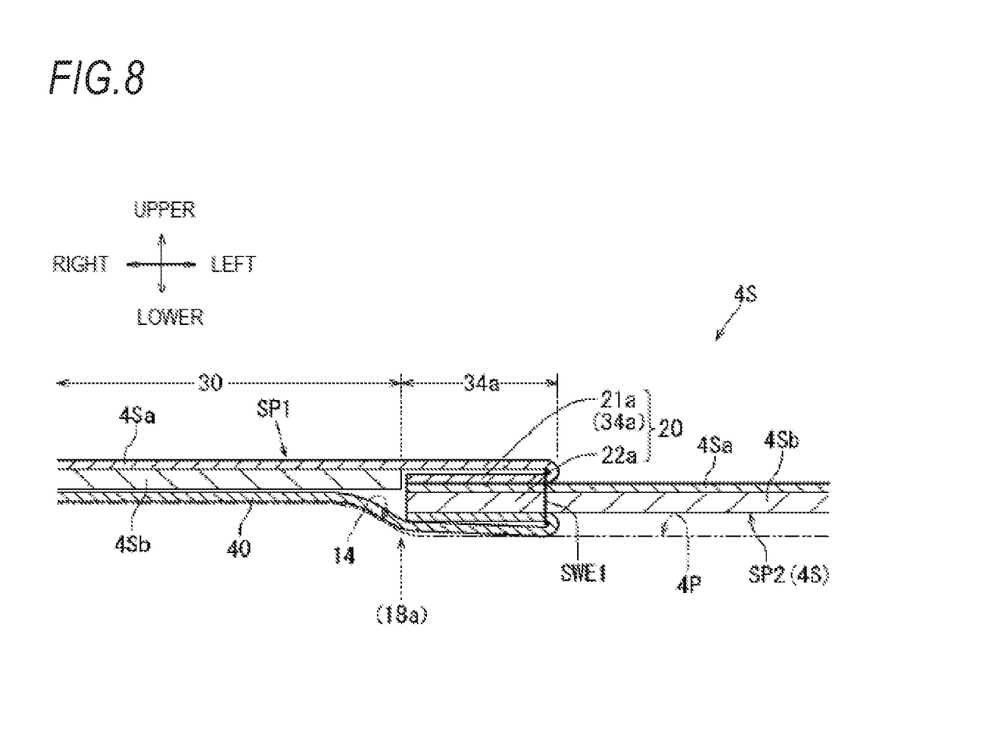
FIG. 8 is a cross-sectional view of the seat cover corresponding to a cross section taken along a line VIII-VIII of FIG. 1.
Figure 9:
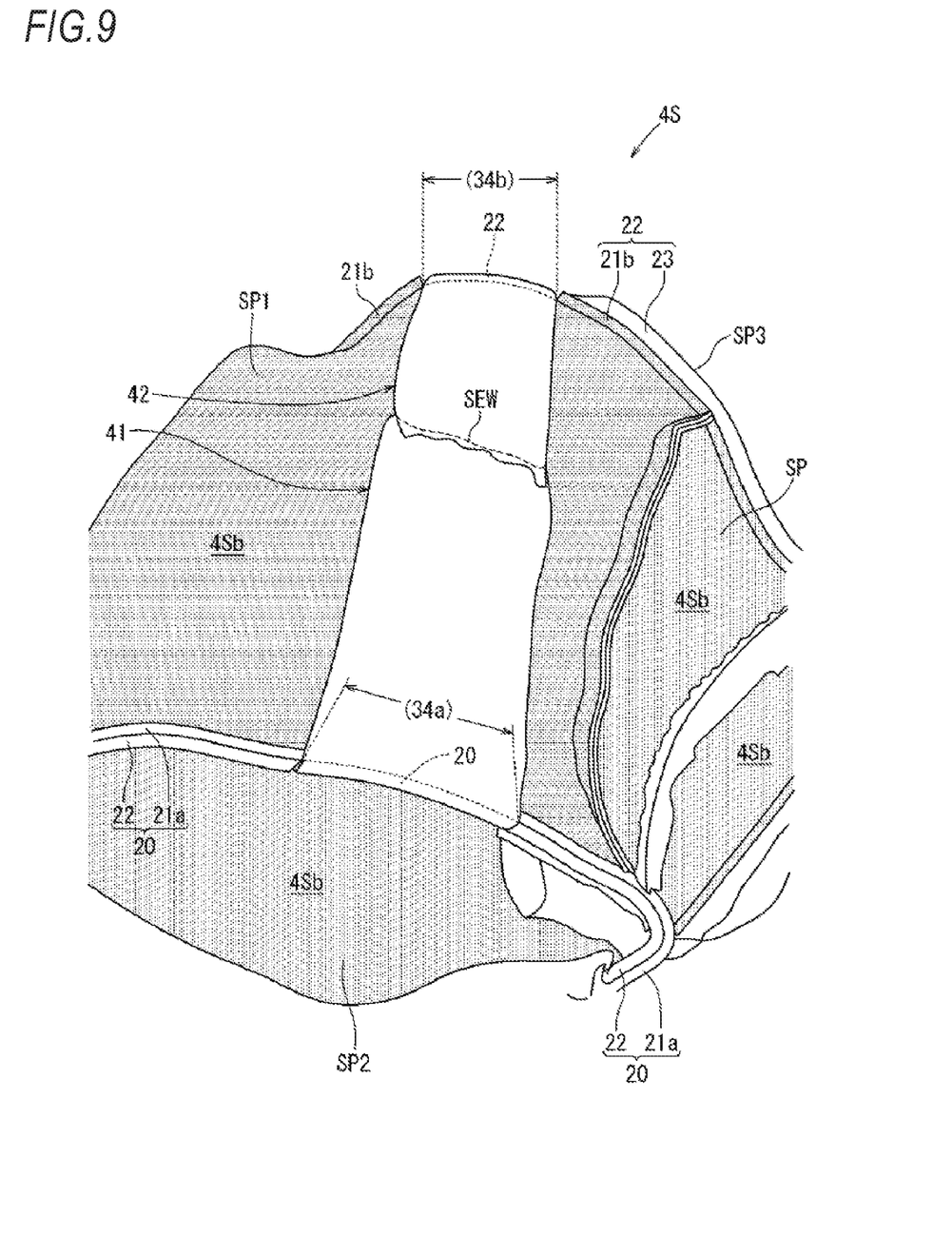
FIG. 9 is a perspective view showing a back surface of the seat cover.

With reference to FIGS. 2, 8, and 9, a pair of regulating members (a left regulating member 40, and a right regulating member 42) are members that regulate a tilting direction of the corresponding sewn portions 20, 22 as which will be described later. Each of the regulating members 40, 42 is a band-shaped planer member with appropriate flexibility, and is long in the left-right direction. As a material of each regulating member 40, 42, a material exemplified in the seat cover 4S (in particular, the surface member) can be used, and preferably a material having a rigidity so as not to be damaged by tensioning. Further, in the embodiment, the pair of regulating members 40, 42 on the left and right is arranged on a back side of the seat cover 4S, and are connected so as to traverse the first cover piece SP1 in the left-right direction.

[Forming Operation of Cover Pieces (Forming Operation of Sewn Portion)]

When forming the seat cover 4S shown in FIG. 2, a seam SEW1 (SEW2) at which the seam allowances are sewn together is formed at the sewn portion 20 (22a), and a corresponding regulating member 40 (42) is attached to an appropriate position of each seam SEW1 (SEW2). For example, when sewing the first cover piece SP1 and the second cover piece SP2 which are shown in FIG. 8, the two cover pieces are overlapped so that front surfaces thereof face each other, and ends of the seam allowances 21a, 22a of both cover pieces are aligned. In this state, the seam allowances 21a, 22a of both cover pieces are sewn at the left seam SEW1 extending in the front-rear direction (an attachment method of the regulating member will be described later). Further, in the above sewing operation, the left seam SEW1 is formed to traverse the left general end portions 32a and the left thin end portion 34a which form the left edge portion of the first cover piece SP1 shown in FIG. 5 in the front-rear direction (with reference to a part indicated by the two-dotted broken line in FIG. 5). Then, the left thin end portion 34a is formed in a part of the left edge portion of the first cover piece SP1, and the other part of the left edge portion is set to be the left general end portions 32a which are relatively thicker. Thus, it is possible to restrain the thin end portion 34a which is relatively thin from curling up or the like at the general end portions 32a on the front and rear sides, which contributes to improvement of workability of the sewing operation. Further, with reference to FIG. 8, the first cover piece SP1 and the second cover piece SP2 are deployed in a planar shape with the left seam SEW1 as a base point, and thus the design surface can be configured by the general portion 30 of each cover piece (For convenience, only the general portion of the first cover piece is denoted by a reference numeral in FIG. 8). Further, in the deployed state, a left sewn portion 20 in which these seam allowances 21a, 22a are overlapped in a state so that front surfaces thereof face each other are arranged on the back side of both cover pieces SP11, SP2. Also, with the similar method, the first cover piece SP1 and the third cover piece SP3 shown in FIG. 2 are sewn together, and thus the right sewn portion 22, in which the right first seam allowance 21b and the third seam allowance 23b are overlapped so that front surfaces thereof face each other, and the right seam SEW2 can be formed.

[Attachment Method of Regulating Member]

Also, with reference to FIGS. 2 and 9, a corresponding regulating member 40 (42) is attached to a part configured by the thin end portion 34a (34b) in the sewn portion 20 (22) along with the above sewing operation. That is, when performing the above sewing operation, a left end of the left regulating member 40 is abutted against a second seam allowance 22a side of the left sewn portion 20 and sewn to the left seam SEW1. Also, a right end of the right regulating member 42 is abutted against a side of the third seam allowance 23b of the right sewn portion 22 and sewn to the right seam SEW2. Further, with reference to FIGS. 2 and 9, free ends of these regulating members 40, 42 are sewn and connected at a sewing line SEW, while stretching the regulating members 40, 42 towards a center of the seat width direction (applying tension in the left-right direction). Since the regulating members 40, 42 are tensioned and brought into a stretched state, a part configured by the thin end portion 34a (34b) in the sewn portion 20, 22 can be stretched so as to be tilted to the back side of the first cover piece SP1. Thus, the left sewn portion 20 is tensioned to a right side by the left regulating member 40, so that the left sewn portion 20 is tilted to the back side of the first cover piece SP1. Also, the right sewn portion 22 is tensioned to the left side by the right regulating member 42, so that the right sewn portion 22 is also tilted to the back side of the first cover piece SP1.

Figure 10:
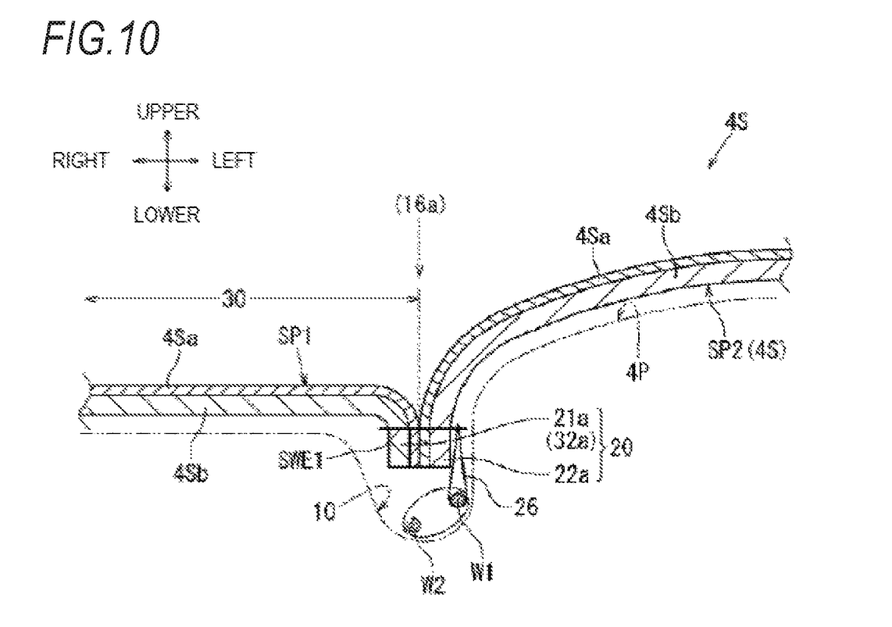
FIG. 10 is a cross-sectional view of the seat cover corresponding to a cross section taken along a line X-X of FIG. 1.

Here, in the embodiment, in the above sewing operation, a suspended cloth 26 and a suspended wire W1 shown in FIG. 10 can be attached to appropriate parts of the sewn portions 20, 22. For example, in the embodiment, a rear part of the left sewn portion 20 is configured by the general end portion 32a on the rear side shown in FIG. 5. Further, with reference to FIG. 10, the rear part of the left sewn portion 20 is a part that is drawn and attached into the longitudinal groove portion 10 along the left general region 16a of the seat pad 4P. Therefore, when performing the above sewing operation, the suspended cloth 26 is sewn to the left seam SEW1 while being abutted against the rear part of the left sewn portion 20, and the suspended wire W is further inserted through the suspended cloth 26. Further, in a later-described operation of covering the seat cover 4S, the suspended wire W1 in the suspended cloth 26 can be can be stopped, by a hook ring, on a fixing wire W2 in the longitudinal groove portion 10 while drawing the rear part of the left sewn portion 20 and the suspended cloth 26 into the longitudinal groove portion 10. Also, similarly, a suspended cloth and a suspended wire (not shown) are also attached to the rear part of the right sewn portion 22 shown in FIG. 5 in a method similar with that of the left sewn portion 20.

[Covering Operation of Seat Cover to Seat Pad]

With reference to FIGS. 1 and 2, the seat pad 4P is arranged on the seat frame 4F (not shown) and covered by the seat cover 4S. As shown in FIG. 2, a front part of the main portion 4a is covered by the first cover piece SP1, the left side portion 4ba is covered by the second cover piece SP2, and the right side portion 4bb is covered by the third cover piece SP3. Further, in the embodiment, the left sewn portion 20, serving as the sewing position of the first cover piece SP1 and the second cover piece SP2, is arranged along the right edge (the general region 16a and the curved region 18a in FIG. 4) of the left side portion 4ba. Also, similarly, the right sewn portion 22, serving as the sewing position of the first cover piece SP1 and the third cover piece SP3, is arranged along the left edge (the general region 16b and the curved region 18b in FIG. 4) of the right side portion 4bb. In this type of configuration, each sewn portion 20, 22 becomes relatively thick for being titled in a certain direction, so that the seat cover 4S may be partially raised, which should be avoided as much as possible from the viewpoint of improving the shape reproducibility of the seat. Particularly in the embodiment, since the sewn portions 20, 22 are arranged on the corresponding curved regions 18a, 18b at the front parts of the left and right side portions 4ba, 4bb, the seat cover 4S may be partially raised excessively.

Therefore, the first cover piece SP1 of the embodiment includes a general portion 30 forming the design surface of the seat and thin end portions 34a, 34b having a thickness smaller than that of the general portion 30. Further, in each sewn portion 20 (22) in the tilted state, the corresponding thin end portion 34a (34b) is bent back towards the back side of the general portion 30 so as to form a lateral U shape. A part arranged on the back side of each thin end portion 34a (34b) is set as the seam allowance 21a (21b) of the first cover piece SP1, and is sewn to the second seam allowance 22a of the second cover piece SP2 (the third seam allowance 23b of the third cover piece SP3). Further, planar regulating members 40, 42 for maintaining the tilting of the sewn portions 20, 22 towards the back side of the first cover piece SP1 are attached to the seat cover 4S.

That is, in the embodiment, with reference to FIGS. 2 and 8, the left sewn portion 20 is arranged along the left curved region 18a of the seat pad 4P, and the left sewn portion 20 is tilted to the right by the left regulating member 40. In the left sewn portion 20 in the tilted state, the left thin end portion 34a, which is bent from the general portion 30 back into the lateral U shape, and the second seam allowance 22a are arranged in a laminated state. Further, the part arranged on the back side of the left thin end portion 34a is set as the left seam allowance 21a and sewn to the second seam allowance 22a. Thus, since a part of the first cover piece SP1 which is overlapped in the left sewn portion 20 is configured by the thin end portion 34a which is relatively thin, it is possible to avoid, as much as possible, the seat cover 4S in the left sewn portion 20 from being raised excessively. Then, in the embodiment, since the left-right length (the length L1 shown in FIG. 7) of the left thin end portion 34a is optimized, the left thin end portion 34a can be bent back into the lateral U shape and arranged on the second seam allowance 22a accurately. Further, since the tilting direction of the left sewn portion 20 is set to be constant by the left regulating member 40, the meandering or folding of the left seam SEW1 can be avoided more reliably, and a bending state of the left thin end portion 34a can be further maintained appropriately.

Similarly, with reference to FIG. 2, the right sewn portion 22 is arranged along the right curved region 18b of the seat pad 4P, and the right sewn portion 22 is tilted to the left by the right regulating member 42. In the right sewn portion 22 in the tilted state, the right thin end portion 34b, which is bent from the general portion 30 back into the lateral U shape, and the third seam allowance 23b are arranged in a laminated state. Further, the part arranged on the back side of the right thin end portion 34b is set as the right seam allowance 22a and sewn to the third seam allowance 23b. Thus, since a part of the first cover piece SP1 which is overlapped in the right sewn portion 22 is configured by the thin end portion 34b which is relatively thin, it is possible to avoid, as much as possible, the seat cover 4S in the right sewn portion 22 from being raised excessively.

Further, in the embodiment, only front portions of the left and right first seam allowances 21a, 21b are configured by the thin end portions 34a, 34b, and the positions of the thin end portions 34a, 34b are clear. Therefore, a part of the sewn portion 20 (22) which is configured by the thin end portion 34a (34b) can be appropriately arranged on the left (right) curved region 18a (18b). Also, since the rear part of the sewn portion 20 (22) are stopped in the corresponding groove portion 10 by a hook ring, it is possible to avoid front-rear positional deviations of the sewn portions 20, 22 as much as possible. Therefore, according to the embodiment, a part of the sewn portion 20 (22) which is configured by the thin end portion 34a (34b) can be positioned and arranged in a corresponding curved region 18a (18b).

[Shape Reproducibility of Seat Cushion]

With reference to FIG. 1, the sewn portions 20, 22 of the seat cover 4S are arranged along peripheral edges of the left and right side portions 4ba, 4bb. In the embodiment, with reference to FIG. 2, the sewn portions 20, 22 configured by corresponding thin end portions 34a, 34b respectively are arranged on the curved regions 18a, 18b at the front parts of the left and right side portions 4ba, 4bb. Therefore, it is possible to avoid, as much as possible, the seat cover 4S from being raised over the curved regions 18a and 18b excessively. Thus, in the embodiment, it is possible to substantially match the shape of the outer surface of the seat pad 4P and the shape of the design surface of the seat cover 4S, which contributes to the improving of the shape reproducibility of the seat. Further, the regulating members 40, 42 are configured by a planar member having flexibility and a thickness thereof is not larger than necessary. Therefore, in the embodiment, it is possible to suitably avoid a problem that the regulating members 40, 42 protrude from the seat cover 4S (highlights occur).

As described above, in the embodiment, since end portions of the first cover piece SP1 (one cover piece) which are bent back to form the lateral U shape in the sewn portions 20, 22 are configured by the thin end portions 34a, 34b which are relatively thin, it is possible to avoid, as much as possible, the seat cover 4S from being raised excessively by the sewn portions 20, 22. Also, in the embodiment, the tilting direction of the sewn portions 20, 22 is set to be constant by the regulating members 40, 42 attached to the seat cover 4S. As a result, the meandering and folding of the seams SEW1 and SEW2 can be avoided more reliably, and meanwhile the thin end portions 34a, 34b forming the sewn portions 20, 22 can be appropriately maintained in a state of being bent back to form the lateral U shape. Also, in the embodiment, since the thin end portions 34a, 34b are arranged on the curved regions 18a, 18b where the sewn portions 20, 22 are relatively easy to be raised, it is possible to avoid, as much as possible, the seat cover 4S on the curved regions 18a, 18b from being raised excessively. Also, in the embodiment, a part of the first cover piece SP1 is configured by the thin end portions 34a, 34b, so that the positions of the thin end portions 34a, 34b are clear. Therefore, it is possible to appropriately arrange the sewn portions 20, 22 configured by the thin end portions 34a, 34b at desired positions of the seat pad 4P. Also, in the embodiment, since the dimensions of the thin end portions 34a, 34b are optimized, it is possible to bend the thin end portions 34a, 34b to form the lateral U shape and arrange the thin end portions 34a, 34b on the seam allowance of the second cover piece SP2 or the third cover piece SP3 (the other cover piece) accurately. Further, in the embodiment, with a relatively simple configuration in which the elastic member 4Sb is removed, it is possible to provide the thin end portions 34a, 34b on the first cover piece SP1 more reliably. Therefore, according to the embodiment, the sewn portions 20, 22 serving as the sewn positions of a pair of cover pieces can be brought into the tilted state without raising the seat cover 4S as much as possible, and arranged along the outer surface of the seat pad 4P.

Modified Example

Here, a forming position of the thin end portion can be set to an appropriate position of the vehicle seat in addition to the above position. For example, a vehicle seat 2A shown in FIG. 11 includes a seat cushion 4A, a seat back 6A, and a headrest 8A, and a basic configuration of these seat configuration members is substantially the same as that of the corresponding members of the first embodiment. Further, the seat back 6A is a member which has a substantially rectangular shape in a front view and on which a back of an occupant can rest, and includes a main portion 6a, side portions 6b, and a frame portion 6c. Further, in the modified example, a thin end portion 34c of the seat cover 6S is arranged on a right-side frame portion 6c of the seat back 6, which is different from the first embodiment.

Figure 11:
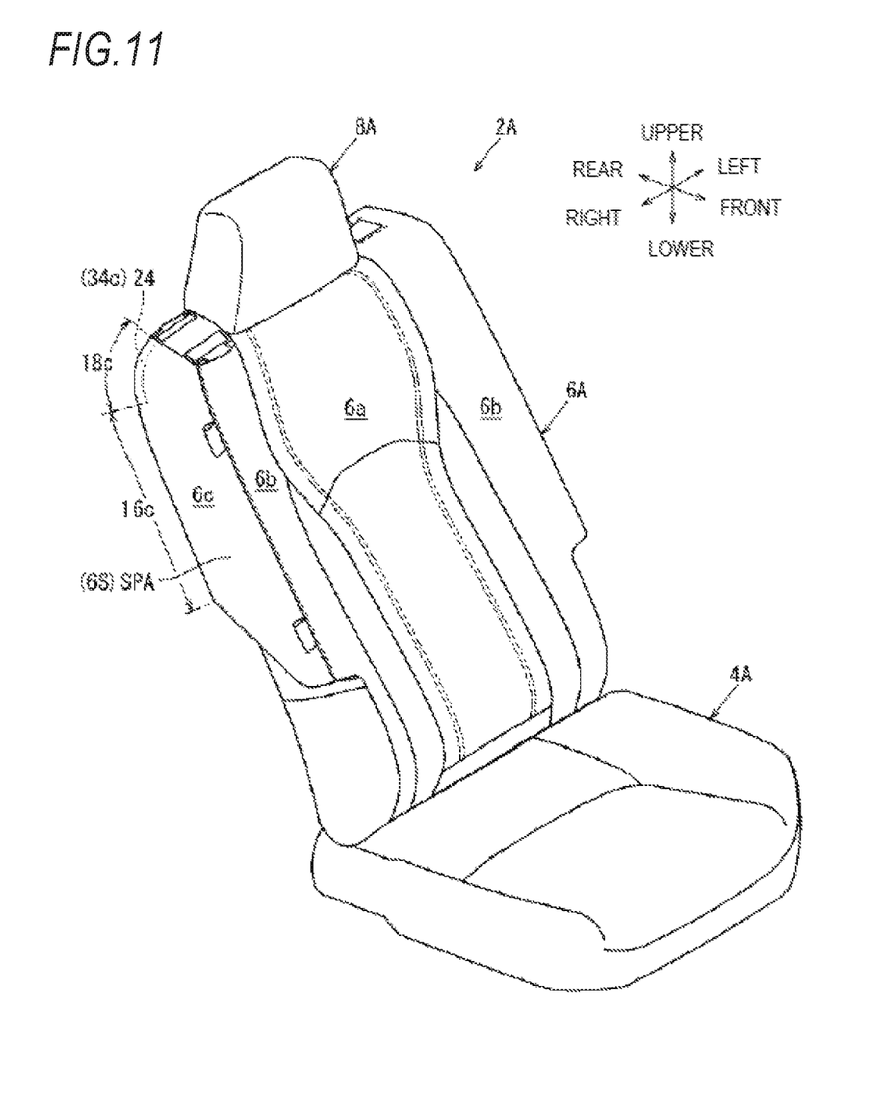
FIG. 11 is a perspective view of a vehicle seat according to a modified example.
Figure 12:
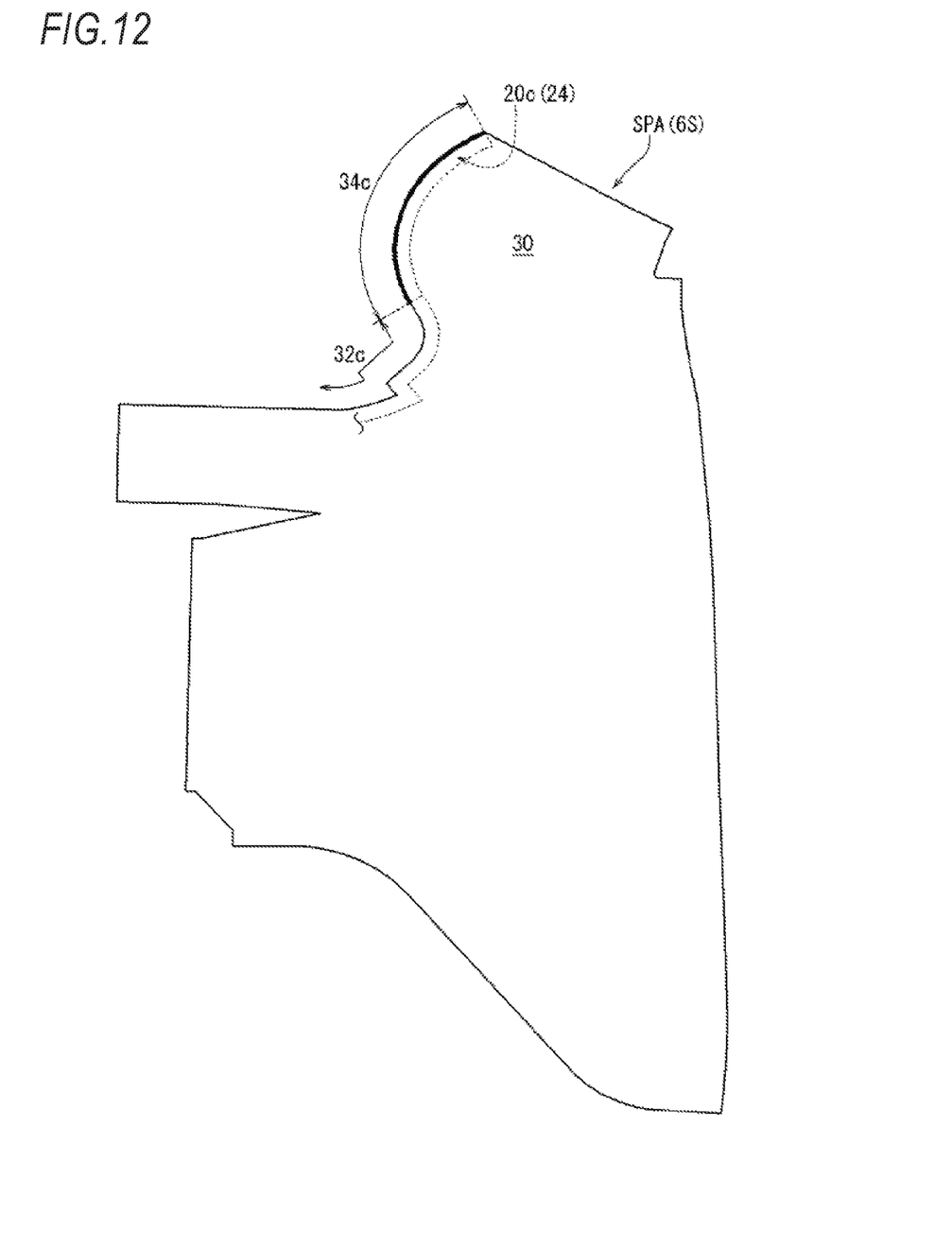
FIG. 12 is a front view of one of cover pieces according to the modified example.

That is, in the seat back 6A (seat pad (not shown)) shown in FIG. 11, the right-side frame portion 6c has a vertically elongated rectangular shape in a side view, and is provided with a general region 16c and a curved region 18c on a rear edge of the frame portion 6c. The general region 16c is a part of a rear edge of the right-side frame portion 6c and extends substantially linearly in an upper-lower direction. Also, the curved region 18c is a rear edge part which is upward above the general region 16c and gradually curves forward as going upward.

Also, the seat cover 6S includes a first cover piece SPA covering the right-side frame portion 6c, and a second cover piece (not shown) covering a rear surface portion (not shown) of the seat back 6. The first cover piece SPA corresponds to the first cover piece of the disclosure and the second cover piece corresponds to the second cover piece of the disclosure. Further, an upper sewn portion 24 serving as a sewing position of the first cover piece SPA and the second cover piece is arranged along the curved region 18c of the right-side frame portion 6c. Here, with reference to FIG. 2, the first cover piece SPA in a deployed state has a shape capable of covering the right-side frame portion 6c shown in FIG. 11 and a part of the rear surface portion. A part of a peripheral edge portion (with reference to a part indicated by a thick line in FIG. 12) of the first cover piece SPA has a semicircular shape, and the semicircular shaped peripheral edge portion is arranged along the curved region 18c of the right-side frame portion 6c shown in FIG. 11. Further, in the first cover piece SPA, a thin end portion 34c is provided on the semicircular shaped peripheral edge portion, and a general end portion 32c is provided on the other peripheral edge portion. Further, the general end portion 32c and the thin end portion 34c form the seam allowance 20c of the first cover piece SPA, and the seam allowance 20c is overlapped with and sewn to the seam allowance (not shown) of the second cover piece so that front surfaces thereof face each other, thus forming the upper sewn portion 24.

Further, in the modified example, with reference to FIG. 11, the upper sewn portion 24 is arranged along the curved region 18c of the right-side frame portion 6c in a state where the seat cover 6S covers the seat pad (not shown). The upper sewn portion 24 in this state is pushed and abutted against the outer surface of the seat pad in a state of being tilted forward on the back side of the seat cover 6S. In the upper sewn portion 24 in the tilted state, the thin end portion 34c which is bent back in a lateral U shape and the seam allowance of the second cover piece are arranged in a laminated state. Therefore, also in the modified example, a part of the first cover piece SPA which is overlapped in the upper sewn portion 24 is configured by the thin end portion 34c which is relatively thin, so that it is possible to avoid, as much as possible, the seat cover 6S in the upper sewn portion 24 from being raised excessively.

The vehicle seats are not limited to the above-described embodiments, and various other embodiments may be adopted. Although the configurations (for example, a shape, a dimension, configurations of the cover pieces, configurations of the regulating members) of the seat cover 4S, 6S have been exemplified in the embodiments, it is not intended to limit the configurations of the seat cover. For example, the one cover piece can be arranged to an appropriate position such as a side portion, a frame portion, a rear surface portion and an upper surface portion in addition to the main portion, and the other cover piece can also be appropriately arranged according to the position of the one cover piece. Further, the sewn portion can be arranged to an appropriate position where rising should be avoided in addition to the curved region, and can also be arranged on the general region. Also, although an example of using a pair of strip members as the regulating member has been described, a surface member with an adhesive layer on one side thereof can be used as the regulating member, and in this case, the regulating member is adhered and fixed to the seat cover so as to cover the tilted sewn portion. Incidentally, each sewn portion may be provided with a regulating member, and a plurality of sewn portions can also share a common regulating member.

Further, the seat cover can also eliminate the regulating member. That is, in a typical vehicle seat, the seat cover covers the seat pad in a state where each cover piece is appropriately stretched by applying tension in a surface direction thereof from the viewpoint of arranging the seat cover with good appearance. Therefore, the sewn portion can be pushed and abutted against the seat pad so as to be brought into the tilted state by utilizing the tension of the seat cover, and particularly in the configuration of the embodiment, the sewn portion can be relatively easily tilted due to the thin end portion.

Also in the embodiment, although the relationship between the general portion, the general end portion, and the thin end portion has been exemplified, the relationship between these portions can be appropriately changed. For example, a general end portion and a thin end portion can be provided only on one edge or all edges of the one cover piece, and the general end portion can be omitted as necessary. Also, the general portion and the general end portion may have the same configuration or different configuration. Also, the thin end portion may be formed by entirely removing the elastic member (including cases where the elastic member is not provided originally), and can also be formed by partially removing the elastic material. Also, in a case where the cover piece is only configured by the surface member, a thin surface member can be used as the thin end portion as necessary. Also, in a case where the cover piece is configured by laminating the surface member, the elastic member, and other planer members (such as a back base cloth), the thin end portion can also be formed by removing other surface members or the like. Also, the length L1 of the thin end portion can be set to be twice or less of the length of the sewn portion as necessary.

Also, in the embodiments, although the configurations (such as a shape, a dimension, a configuration portion) of the vehicle seat 2 has been exemplified, it is not intended to limit the configurations of the vehicle seat. For example, in the embodiments, although a single person's vehicle seat arranged in a third row in the vehicle compartment has been exemplified, the vehicle seat may be arranged in the first row or the second row and may be used for one person or a plurality of persons. Also, in the embodiments, although the seat cushion 4 or the seat back 6 has been described as an example, the configurations of the embodiments can be applied to various seat configuration members such as a headrest or an armrest. Further, the configurations of the embodiments can be applied to any seat of a vehicle, an aircraft, an electric train or the like.

The disclosure provides illustrative, non-limiting examples as follows:

According to a first aspect of the disclosure, there is provided a vehicle seat including: a seat pad forming an outer shape of the seat; and a seat cover covering an outer surface of the seat pad, the seat cover including: a first cover piece and a second cover piece which are arranged adjacent to each other; and a sewn portion in which a seam allowance of the first cover piece and a seam allowance of the second cover piece are overlapped so that front surfaces thereof face each other and are sewn to each other, wherein the first cover piece and the second cover piece are deployed in a planar shape with the sewn portion serving as a base point and cover an surface of the seat pad in a state where at least a part of the sewn portion arranged at back sides of the first and second cover pieces is tilted towards the back side of the first cover piece, wherein the first cover piece includes a general portion which forms a design surface of the seat and a thin end portion which projects from an edge of the general portion and has a thickness smaller than a thickness of the general portion, and wherein in the sewn portion in a tilted state, the thin end portion is bent back towards a back side of the general portion so as to form a lateral U shape, and a part of the thin end portion which is arranged at a back side thereof serves as the seam allowance of the first cover piece and is overlapped with and sewn to the seam allowance of the second cover piece.

Accordingly, since an end portion of the first cover piece which is bent back to form the lateral U shape in the sewn portion is configured by the thin end portion which is relatively thin, it is possible to avoid, as much as possible, the seat cover from being raised excessively due to the sewn portion.

According to a second aspect of the disclosure, there is provided the vehicle seat according to the first aspect, wherein a planar regulating member that maintains the sewn portion to be tilted towards the back side of the first cover piece is attached to the seat cover.

Accordingly, a tilting direction of the sewn portion is set to be constant by the regulating member attached to the seat cover. Therefore, meandering and folding of the seam can be avoided more reliably, and the thin end portion forming the sewn portion can be appropriately maintained in a state of being bent back to form a lateral U shape.

According to a third aspect of the disclosure, there is provided the vehicle seat according to the first or second aspect, wherein the outer surface of the seat pad is divided into a plurality of parts including a first part and a second part, and on a periphery of the first part, a general region extending in a first direction and a curved region curved towards a second direction different from the first direction are provided adjacent to each other, and wherein, in a state where the sewn portion is arranged along the periphery of the first part, the thin end portion is arranged along the curved region.

Accordingly, since the thin end portion is arranged in the curved region at which the sewn portion is relatively easy to be raised, it is possible to avoid, as much as possible, the seat cover on the curved region from being raised excessively.

According to a fourth aspect of the disclosure, there is provided the vehicle seat according to any one of the first to third aspects, wherein a part of the seam allowance of the first cover piece is configured by the thin end portion.

Accordingly, a part of the seam allowance of the first cover piece is configured by the thin end portion, and that the position of the thin end portion is clear. Therefore, it is possible to appropriately arrange the sewn portion configured by the thin end portion on a desired position of the seat pad.

According to a fifth aspect of the disclosure, there is provided the vehicle seat according to any one of the first to fourth aspects, wherein a length of the thin end portion in a direction projecting from the general portion is set to be twice or more of a length of the sewn portion.

Accordingly, since the length of the thin end portion is optimized, it is possible to bend the thin end portion back to form the lateral U shape and arrange the thin end portion on the seam allowance of the second cover piece accurately.

According to a sixth aspect of the disclosure, there is provided the vehicle seat according to any one of the first to fifth aspects, wherein the seat cover includes a surface member configuring the design surface of the seat and an elastically expandable and contractible elastic member, the surface member and the elastic member being laminated, and wherein the thickness of the thin end portion is set to be smaller than the thickness of the general portion by removing the elastic member.

Accordingly, with a relatively simple configuration in which the elastic member is removed, it is possible to provide the thin end portion to the first cover piece more reliably.

According to the first aspect of the disclosure, it is possible to arrange the sewn portion serving as the sewing position of the first and second cover pieces along the outer surface of the seat pad in a tilted state without raising the seat cover as much as possible. Further, according to the second aspect of the disclosure, it is possible to more reliably set the sewn portion into a tilted state without raising the seat cover. Further, according to the third aspect of the disclosure, it is possible to arrange the sewn portion along the outer surface of the curved region of the seat pad in a tilted state without raising the seat cover as much as possible. Further, according to the fourth aspect of the disclosure, it is possible to arrange the sewn portion along an appropriate portion on the outer surface of the seat pad in a tilted state without raising the seat cover more reliably. Further, according to the fifth aspect of the disclosure, it is possible to further more reliably set the sewn portion into a tilted state without raising the seat cover. Further, according to the sixth aspect of the disclosure, it is possible to arrange the sewn portion along the outer surface of the seat pad in a tilted state without raising the seat cover as much as possible with a relatively simple configuration.

What it claimed is:

1. A vehicle seat comprising:
   a seat pad forming an outer shape of the seat; and
   a seat cover covering an outer surface of the seat pad, the seat cover including:
   a first cover piece and a second cover piece which are arranged adjacent to each other, and
   a sewn portion in which a seam allowance of the first cover piece and a seam allowance of the second cover piece are overlapped so that front surfaces thereof face each other and are sewn to each other,
   wherein the first cover piece and the second cover piece are deployed in a planar shape with the sewn portion serving as a base point and covering a surface of the seat pad in a state where at least a part of the sewn portion arranged at back sides of the first and second cover pieces is tilted towards the back side of the first cover piece,
   wherein the first cover piece includes a general portion which forms a design surface of the seat and a thin end portion which projects from an edge of the general portion and has a thickness smaller than a thickness of the general portion, and
   wherein in the sewn portion in a tilted state, the thin end portion is bent back towards a back side of the general portion so as to form a lateral U shape, and a part of the thin end portion which is arranged at a back side thereof serves as the seam allowance of the first cover piece and is overlapped with and sewn to the seam allowance of the second cover piece.

2. The vehicle seat according to claim 1,
   wherein a planar regulating member that maintains the sewn portion to be tilted towards the back side of the first cover piece is attached to the seat cover.

3. The vehicle seat according to claim 1,
   wherein the outer surface of the seat pad is divided into a plurality of parts including a first part and a second part, and on a periphery of the first part, a general region extending in a first direction and a curved region curved towards a second direction different from the first direction are provided adjacent to each other, and
   wherein, in a state where the sewn portion is arranged along the periphery of the first part, the thin end portion is arranged along the curved region.

4. The vehicle seat according to claim 1,
   wherein a part of the seam allowance of the first cover piece is configured by the thin end portion.

5. The vehicle seat according to claim 1,
   wherein a length of the thin end portion in a direction projecting from the general portion is set to be twice or more of a length of the sewn portion.

6. The vehicle seat according to claim 1,
   wherein the seat cover includes a surface member configuring the design surface of the seat and an elastically expandable and contractible elastic member, the surface member and the elastic member being laminated, and
   wherein the thickness of the thin end portion is set to be smaller than the thickness of the general portion by removing the elastic member.

* * * * *